United States Patent [19]

Tsukamoto et al.

[11] Patent Number: 5,061,229
[45] Date of Patent: Oct. 29, 1991

[54] FOUR-WHEEL DRIVE DEVICE

[75] Inventors: kazumasa Tsukamoto; Takao Taniguchi; Takuji Taniguchi; Takahiro Yamashita, all of Aichi, Japan

[73] Assignee: Aisin Aw Kabushiki Kaisha, Japan

[21] Appl. No.: 599,090

[22] Filed: Oct. 17, 1990

[30] Foreign Application Priority Data

Oct. 18, 1989 [JP]  Japan .................................. 1-269125

[51] Int. Cl.⁵ ............................ F16H 1/42; F16H 1/46
[52] U.S. Cl. .................................................... 475/249
[58] Field of Search ............... 475/248, 249, 295, 328, 475/332

[56] References Cited

U.S. PATENT DOCUMENTS

| | | | |
|---|---|---|---|
| 4,458,557 | 7/1984 | Hayakawa | 475/295 X |
| 4,713,988 | 12/1987 | Harada et al. | 475/295 X |
| 4,756,209 | 7/1988 | Hamada et al. | 475/249 X |
| 4,768,399 | 9/1988 | Kubo et al. | 475/249 X |
| 4,819,506 | 4/1989 | Matsumoto | 475/249 X |

Primary Examiner—Dirk Wright
Attorney, Agent, or Firm—Lorusso & Loud

[57] ABSTRACT

A transfer portion connected to the output shaft of a transmission portion has a front planetary gear unit the output element of which is connected to the front wheels and a rear planetary gear unit the output element of which is connected to the rear wheels, the two units being connected to each other by a common element. The output shaft of the transmission portion is directly connected to the input element of either of the planetary gear units, while the same is connected to the input element of the other planetary gear unit via a clutch $C_3$. Furthermore, the input element of the other planetary gear unit is connected to the case via a brake $B_4$. Therefore, the reduction function can be realized in cooperation with the two planetary gear units. As a result, the four-wheel drive device is lightened. Furthermore, since the differential gear device is constituted by the planetary gear unit, a compact and light four-wheel drive device can be provided and the neutral state can be created by completely freeing the front and the rear wheels.

12 Claims, 3 Drawing Sheets

| POSITION | | CLUTCH | | | BRAKE | | | | OWC | | |
|---|---|---|---|---|---|---|---|---|---|---|---|
| | | C₁ | C₂ | C₀ | B₁ | B₂ | B₃ | B₀ | F₁ | F₂ | F₀ |
| P | | × | × | ○ | × | × | × | × | × | × | × |
| R | | × | ○ | ○ | × | × | ○ | × | × | × | ⊗ |
| R (V≧9) | | × | × | ○ | × | × | × | × | × | × | ⊗ |
| N | | × | × | ○ | × | × | × | × | × | × | × |
| D | 1 ST | ○ | × | ○ | × | × | × | × | × | ○ | ⊗ |
| | 2 ND | ○ | × | ○ | × | ○ | × | × | ○ | × | ⊗ |
| | 3 RD | ○ | ○ | ○ | × | ○ | × | × | × | × | ⊗ |
| | 4 TH | ○ | ○ | × | × | ○ | × | ○ | × | × | × |
| 2 | 1 ST | ○ | × | ○ | × | × | × | × | × | ○ | ⊗ |
| | 2 ND | ○ | × | ○ | ○ | ○ | × | × | ⊗ | × | ⊗ |
| | 3 RD | ○ | ○ | ○ | × | ○ | × | × | × | × | ⊗ |
| | (3 RD) | ○ | ○ | ○ | × | ○ | × | × | × | × | ⊗ |
| L | 1 ST | ○ | × | ○ | × | × | ○ | × | × | ○ | ⊗ |
| | 2 ND | ○ | × | ○ | ○ | ○ | × | × | ⊗ | × | ⊗ |
| | (1 ST) | ○ | × | ○ | × | × | ○ | × | × | ○ | ⊗ |
| REMARKS | ○ ON | | | CONNECTION | | | | | LOCK | | |
| | × OFF | | | DISCONNECTION | | | | | FREE | | |
| | ◎ ON: L-UP ON<br>○ OFF: L-UP OFF | | | | | | | | | | |
| | ⊗ | | | | | | | | FREE AT COAST | | |

FIG. 2

|  |  | CLUTCH | | BRAKE |
| --- | --- | --- | --- | --- |
|  |  | C₃ | C₄ | B₄ |
| CENTER DIFFERENTIAL 4WD | High | ○ |  |  |
|  | Low |  |  | ○ |
| RIGID 4WD | High | ○ | ○ |  |
|  | Low |  | ○ | ○ |
| TORQUE SPLIT 4WD | High | ○ | SLIP |  |
|  | Low |  | SLIP | ○ |
| NEUTRAL |  |  |  |  |

FIG. 3

FOUR-WHEEL DRIVE DEVICE

BACKGROUND OF THE INVENTION

1. Field of the Invention

The present invention relates to a four-wheel drive device capable of optionally setting the torque distribution ratio to the front wheels and the rear wheels.

2. Related Art Statement

Hitherto, it has been possible to drive a front-wheel drive vehicle straight ahead on a road more safely than a rear-wheel drive vehicle. However, a front-wheel drive vehicle cannot be made to easily turn a corner since a driver must continue to maintain the tire in a position which enables the vehicle to completely turn the corner against the urge of the tire to return to the original straight ahead position. On the contrary, it is possible to make the rear-wheel drive vehicle easily turn a corner. However, it has a problem in that the vehicle of this type easily slips on a slippery road.

Accordingly, there has been disclosed a four-wheel drive device capable of distributing the driving force to the front wheels and the rear wheels so that the vehicle is operated by the driving force thus distributed. However, the four-wheel drive device encounters a problem in that the vehicle is brought to a braking state due to the difference in rotational speed between the front wheels and the rear wheels when the vehicle is rapidly turned at low speed on a road having a large friction coefficient, that is, a tight-corner braking phenomenon is undesirably generated.

In order to overcome the above-described problem, a central differential gear device is provided so as to absorb the difference in the rotational between the front wheels and the rear wheels. That is, in the above-described four-wheel drive device, the rotation of the engine is first devided by the central differential gear device so as to be transmitted to a differential gear device for the front wheels and that for the rear wheels via the propeller shaft.

However, in the conventional four-wheel drive device, torque transmitted from the transmission portion thereof is enlarged by a reduction device before it is transmitted to the transfer portion.

That is, the output shaft of the transmission portion is connected to the input shaft of the transfer portion via the reduction gear so that the torque transmitted from the transmission portion is supplied to the central differential gear device after its level has been changed by the reduction gear.

In this case, the strength of the above-described differential gear device connected to the reduction gear is determined depending upon the level of the torque obtainable from the reduction gear. Therefore, the size of the central differential gear device must be enlarged so as to correspond to a large-capacity engine. As a result, a problem arises in that the size and the weight of the transfer portion cannot be reduced.

Accordingly, an object of the present invention is to provide a four-wheel drive device capable of enlarging the torque transmitted from a transmission and reducing the size and the weight of the transfer portion.

SUMMARY OF THE INVENTION

An object of the present invention is to provide a four-wheel drive device capable of overcoming the above-described problem experienced with the conventional four-wheel drive device. Therefore, another object of the present invention is to provide a four-wheel drive device capable of enlarging the torque transmitted from a transmission and reducing the size and the weight of the transfer portion.

In order to achieve the above-described objects, an aspect of the present invention lies in a four-wheel drive device having a transmission portion and a transfer portion so that torque transmitted from the transmission portion is divided into torque for driving the front wheels and that for driving the rear wheels by the transfer portion.

The transfer portion has a front planetary gear unit and a rear planetary gear unit connected to each other by a common element, the output element of the front planetary gear unit is connected to the front wheels and the output element of the rear planetary gear unit is connected to the rear wheels.

The output shaft of the transmission portion is directly connected to the input element of either of the two planeratry gear units, and the same is connected to the input element of the other planetary gear unit via a first cluch. Furthermore, the input element of the other planetary gear unit is connected to the case via a brake.

The first clutch is connected in the non-deceleration state and is disconnected in the deceleration state and the neutral state and the brake is disconnected in the non-deceleration state and the neutral state and is connected in the deceleration state.

A second clutch is disposed between the output element of the front planetary gear unit and the output element of the rear planetary gear unit, wherein the state of connection of the second clutch can be successively changed between the completely-connected state and the completely-disconnected state so that torque can be distributed to the front wheels and the rear wheels.

Either of the planetary gear units is a rear planetary gear unit and the other planetary gear unit is a front planetary gear unit.

The output element of the front planetary gear unit is a ring gear, the output element of the rear planetary gear unit is a carrier, the input element of the front planetary gear unit is a carrier, the input element of the rear planetary gear unit is a ring gear and the common element for the two planetary gear units is a sun gear.

BRIEF DESCRIPTION OF DRAWINGS

Other and further objects, features and advantages of the invention will be appear more fully from the following drawings.

FIG. 2 illustrates the operation of a transmission portion; and

FIG. 3 illustrates the operation of a transfer portion.

DESCRIPTION OF PREFERRED EMBODIMENT

Figure 1:
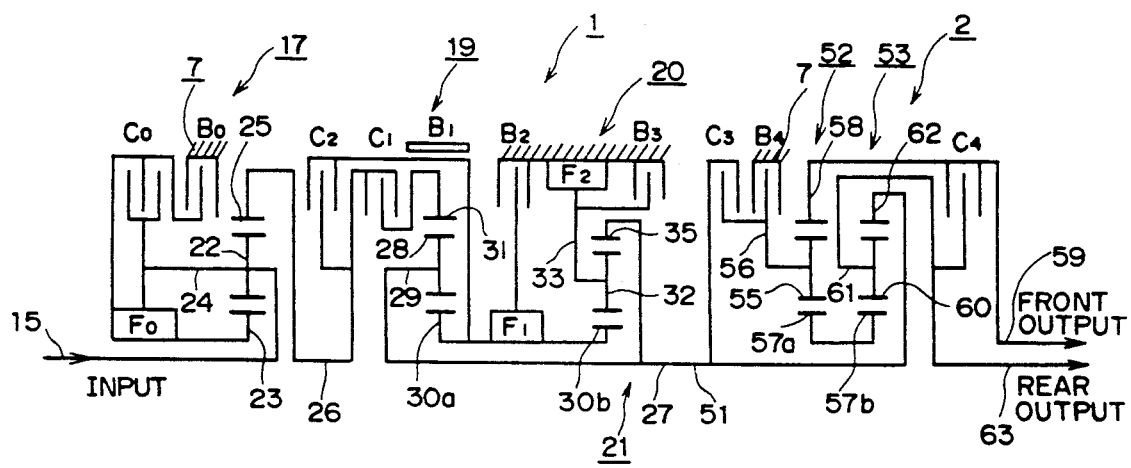
FIG. 1 illustrates a power transmission system of an embodiment of a four-wheel drive device according to the present invention.

A four-wheel drive device according to the present invention will now be described in detail with reference to the drawings.

FIG. 1 illustrates a power transmission system for a four-wheel drive device according to the present invention.

Referring to the drawing, the four-wheel drive device comprises a transmission portion 1 which constitutes an automatic transmission and a transfer portion 2 for distributing the torque, the speed of which has been changed by the transmission portion 1, to the front wheels and the rear wheels.

The transmission portion 1 is connected to a torque converter (omitted from the illustration) so as to receive the torque of the engine via the torque converter. As a result, the transmission portion 1 performs the gear changing operation.

The transmission portion 1 has an overdrive planetary gear unit 17 and a main gear unit 21 comprising a front planetary gear unit 19 and a rear planetary gear unit 20.

The overdrive planetary gear unit 17 is connected to an input shaft 15, the overdrive planetary gear unit 17 comprising a carrier 24 for supporting a planetary pinion 22, a sun gear 23 for surrounding the input shaft 15 and a ring gear 25 connected to an input shaft 26 of the main gear unit 21.

There is provided an overdrive direct clutch $C_0$ and a one-way clutch $F_0$ between the carrier 24 and the sun gear 23. Furthermore, an overdrive brake $B_0$ is disposed between the sun gear 23 and the case 7.

The front planetary gear unit 19 is connected to an output shaft 27, the front planetary gear unit 19 comprising a carrier 29 for supporting a planetary pinion 28, a sun gear 30$a$ surrounding the output shaft 27 and integrally formed with a sun gear 30$b$ of the rear planetary gear unit 20 and a ring gear 31 connected to an input shaft 26 via a forward clutch $C_1$. There is provided a direct clutch $C_2$ between the input shaft 26 and the sun gear 30$a$, while a second coast brake $B_1$ comprising a band brake is disposed between the sun gear 30$a$ and the case 7. In addition, a second brake $B_2$ of a multiple disc type is disposed between the sun gear 30$a$ and the case 7 via a one-way clutch $F_1$.

The rear planetary gear unit 20 comprises a carrier 33 for supporting a planetary pinion 32, a sun gear 30$b$ and a ring gear 35 directly connected to the output shaft 27. A first-and-reverse brake $B_3$ and a one-way clutch $F_2$ are, in parallel with each other, disposed between the carrier 33 and the case 7.

The clutches $C_0$, $C_1$ and $C_2$, brakes $B_0$, $B_1$, $B_2$ and $B_3$ and one way clutches $F_0$, $F_1$ and $F_2$ of the automatic transmission of the type described above are controlled at each of the gear positions P, R, R (V≧9), N, D, 2nd and L as shown in FIG. 2.

That is, the overdrive direct clutch $C_0$, one-way clutches $F_0$ and $F_2$ and the forward clutch $C_1$ are connected and the other clutches are disconnected at the first speed in the range D or the 2nd range. Therefore, the overdrive planetary gear unit 17 is in an integrally and directly-connected state via the overdrive direct clutch $C_0$ and the one-way clutch $F_0$. As a result, the rotation of the input shaft 15 is directly transmitted to the input shaft 26 of the main gear unit 21.

In the main gear unit 21, the rotation of the input shaft 26 is transmitted to the ring gear 31 of the front planetary gear unit 19 via the forward clutch $C_1$. The rotation is further transmitted to the carrier 29 and the output shaft 27 which is integrally disposed with the carrier 29. Although the leftward rotation is transmitted to the carrier 33 of the rear planetary gear unit 20 via the sun gear 30, it is stopped by the one-way clutch $F_2$. As a result, the planetary pinion 32 rotates so as to transmit the power to the ring gear 35 integrally disposed with the output shaft 27.

The overdrive direct clutch $C_0$, the one-way clutch $F_0$, the forward clutch $C_1$, the one-way clutch $F_1$ and the second brake $B_2$ are connected and the other clutched are disconnected at the second speed in the range D. Therefore, the overdrive planetary gear unit 17 is in the above-described directly connected state. As a result, the rotation of the input shaft 15 is directly transmitted to the input shaft 26 of the main gear unit 21.

In the main gear unit 21, the rotation of the input shaft 26 is transmitted to the ring gear 31 of the front planetary gear unit 19 via the forward clutch $C_1$. As a result, the leftward rotation is transmitted to the sun gear 30 via the planetary pinion 28. However, the leftward rotation of the sun gear 30 is prevented by the one-way clutch $F_1$ which is connected to the second brake $B_2$. Therefore, the carrier 29 rotates with the planetary pinion 28 being rotated, causing the rotation of the second speed to be transmitted to the output shaft 27 via only the planetary gear unit 19.

The overdrive direct clutch $C_0$, the one-way clutch $F_0$, the forward clutch $C_1$, the direct clutch $C_2$ and the second brake $B_2$ are connected and the other clutches are disconnected at the third speed in the range D and the 2nd range. Therefore, the overdrive planetary gear unit 17 is in the above-described directly connected state. In the main gear unit 21, the front planetary gear unit 19 is brought into an integrated state due to the connection established between the forward clutch $C_1$ and the direct clutch $C_2$.

Therefore, the rotation of the input shaft 26 is transmitted to the output shaft 27 as it is.

The forward clutch $C_1$, the direct clutch $C_2$ and the second brake $B_2$ are connected and the main gear unit 21 is, similarly to the third speed state, in the directly connected state at the fourth speed, that is, the top speed in the range D. However, the overdrive planetary gear unit 17 is switched in such a manner that the overdrive direct clutch $C_0$ is disconnected and the overdrive brake $B_0$ is connected. Therefore, the above-described sun gear 23 is locked up by the overdrive brake $B_0$. As a result, the planetary pinion 22 rotates with the carrier 24 being rotated, causing the power to be transmitted to the ring gear 25. Therefore, the rotation of the overdrive mode is transmitted to input shaft 26 of the main gear unit 21 which is in the directly connected state.

As for the downward shift of the gear transmission, the overdrive direct clutch $C_0$ is connected and the overdrive brake $B_0$ is disconnected in the case of shifting from the fourth speed to the third speed. The direct clutch $C_2$ is disconnected in the case of shifting from the third speed to the second speed. Furthermore, the second brake $B_2$ is disconnected in the case of shifting from the second speed to the first speed.

When the manual valve is shifted to the 2nd range, the operation at the first speed and that at the third speed are the same as that performed in the range D. At the second speed, the forward clutch $C_1$, the overdrive direct clutch $C_0$, the second brake $B_2$ and the second coast brake $B_1$ are connected. As a result, the sun gear 30 of the main gear unit 21 is locked up so that the engine brake is caused to act.

At the second speed in the range L, the operation is the same as that at the second speed in the 2nd range. However, the forward clutch $C_1$, the overdrive direct clutch $C_0$ and the first-and-reverse brake $B_3$ are connected at the first speed. As a result, the carrier 33 of the rear planetary gear unit 20 is locked up so that the engine brake is caused to act.

In the range R, the overdrive direct clutch $C_0$, the one-way clutch $F_0$, the direct clutch $C_2$ and the brake $B_3$ are connected and the other elements are disconnected. Therefore, the overdrive planetary gear unit 17 is in the directly connected state. Furthermore, in the main gear unit 21, the rotation of the input shaft 26 is, by the direct clutch $C_2$, directly transmitted to the sun gear 30. Furthermore, the rotation of the rear carrier 33 is locked up by the brake $B_3$. Therefore, the rotation of the sun gear 30 rotates the planetary pinion 32 and is as well transmitted, as the reverse rotation, to the ring gear 35 so that the output shaft 27 is rotated reversely.

Even if the manual valve 51 is shifted to the rage R, the output shaft 27 is not rotated reversely since the direct clutch $C_2$ is in the disconnected state when the vehicle speed exceeds, for example, 9 km/h. That is, the structure is arranged in such a manner that the direct clutch $C_2$ is not connected during the operation of the vehicle at a speed exceeding a predetermined speed.

Then, the transfer portion 2 connected to the above-described transmission portion 1 will be described.

Torque, the speed of which has been changed by the transmission portion 1 shown in FIG. 1, is transmitted from the output shaft 27 to the transfer portion 2 via the input shaft 15.

The transfer portion 2 comprises a front planetary gear unit 52 and a rear planetary gear unit 53, the transfer portion 2 being in the form of a torque-flight type planetary gear set for inputting torque, supplied via the input shaft 51, to the rear planetary gear unit 53.

The front planetary gear unit 52 comprises a carrier 56 for supporting a planetary pinion 55, a sun gear 57a and a ring gear 58 connected to a front output shaft 59.

The carrier 56 of the front planetary gear unit 52 is connected to the input shaft 51 via a direct clutch $C_3$ (a first clutch) and is as well connected to the case 7 via a brake $B_4$. That is, the carrier 56 serves as an input element, while the ring gear 58 serves as an output element.

The rear planetary gear unit 53 comprise a carrier 61 for supporting a planetary pinion 60, a sun gear 57b and a ring gear 62 connected to the input shaft 51. The carrier 61 of the planetary gear unit 53 is connected to a rear output shaft 63 and is as well connected to the front output shaft 59 via a differential-limiting clutch $C_4$ (a second clutch). That is, the carrier 61 serves as an output element, while the ring gear 62 serves as an input element.

The sun gear 57a of the front planetary gear unit 52 and the sun gear 57b of the rear planetary gear unit 53 are integrally formed with each other so as to constitute a common element.

In the transfer portion 2 thus constituted, when the brake $B_4$ is disconnected and the direct clutch $C_3$ is connected, torque supplied via the input shaft 51 is supplied to the front planetary gear unit 52 via the carrier 61. Also the torque is supplied to the rear planetary gear unit 53 via the carrier 61.

According to this embodiment, two planetary gear units 52 and 53 are arranged in such a manner that the number of teeth of its ring gears 58 and 62 is 60, that of the pinion gears 55 and 60 is 17, and that of the sun gears 57a and 57b is 27. Therefore, the reduction ratio becomes 1, causing the torque distribution ratio to the front wheels and the rear wheels to become 41:59.

When the direct clutch $C_3$ is disconnected and the brake $B_4$ is connected, the carrier 56 of the front planetary gear unit 52 is fixed to the case 7. Therefore, the torque supplied to the ring gear 62 of the rear planetary gear 53 is transmitted at a reduction ratio 2.450 which is determined by the number of teeth of the elements of the two planetary gear units 52 and 53. At this time, the torque distribution ratio to the front wheels and the rear wheels is 41:59.

The above-described differential-limiting clutch $C_4$ is able to change the torque distribution by creating a slip state by successively changing the state of the connection.

That is, in the case where the differential-limiting clutch $C_4$ is in the completely connected state, the rigid 4WD state is realizied in which the torque distribution to the two output shafts 59 and 63, that is, the front wheels and the rear wheels, become 50:50.

When the differential-limiting clutch $C_4$ is in a completely disconnected state, the center-differential 4WD state is realized in which the torque distribution to the front and the rear wheels is determined to be 41:59 depending upon the number of teeth of the elements of the two planetary gear units 52 and 53.

As described above, the torque distribution ratio to the front wheels and the rear wheels can be varied from 41:59 in the center-differential 4WD state to 50:50 in the rigid 4WD state by changing the state of the connection of the differential-limiting clutch $C_4$.

The direct clutch $C_3$, the differential-limiting clutch $C_4$ and the brake $B_4$ of the transfer portion 2 thus structured are respectively controlled as shown in FIG. 3.

That is, the direct clutch $C_3$ is connected and the brake $B_4$ is disconnected in the non-deceleration state in the center-differential 4WD mode. Furthermore, the front planetary gear unit 52 and the rear planetary gear unit 53 are respectively brought into the directly connected state, causing the reduction ratio to become 1. At this time, the torque distribution to the front output shaft 59 and the rear output shaft 63 becomes 41:59.

In the deceleration state in the center-differential 4WD mode, the direct clutch $C_3$ is disconnected and the brake $B_4$ is connected.

As a result, the carrier 56 of the front planetary gear unit 52 is fixed, causing the deceleration state to be realized. In this state, the reduction ratio becomes 2.450. Furthermore, the torque distribution to the front output shaft 59 and the rear output shaft 63 becomes 41:59.

In the non-deceleration state in the rigid 4WD mode, the direct clutch $C_3$ and the differential-limiting clutch $C_4$ are connected. Therefore, the reduction ratio becomes 1, while the torque distribution to the front output shaft 59 and the rear output shaft 63 becomes 50:50.

In the deceleration state in the rigid 4WD mode, the direct clutch $C_3$ is disconnected and the differential-limiting clutch $C_4$ and the brake $B_4$ are connected. As a result, the carrier 56 of the front planetary gear unit 52 is fixed, causing the reduction ratio to become 2.450 and the torque distribution to the front output shaft 59 and the rear output shaft 63 to become 50:50.

In the non-deceleration state in the torque split 4WD mode in which the differential-limiting clutch $C_4$ is slipped, the direct clutch $C_3$ is connected and the differential-limiting clutch $C_4$ is, with being slipped, connected. At this time, the torque distribution to the front output shaft 59 and the rear output shaft 63 becomes a ratio between 41:59 and 50:50.

In the deceleration state in the torque split 4WD mode, the brake $B_4$ is connected and the differential-limiting clutch $C_4$ is, with being slipped, connected. As a result, the carrier 56 of the front planetary gear unit 52 is fixed, causing the reduction ratio to become 2.450. Therefore, enlarged torque can be transmitted.

In the neutral state, the reaction force in the planetary gear units 52 and 53 is eliminated by disconnecting the direct clutch $C_3$ and the differential-limiting clutch $C_4$. Therefore, the rotation of the front output shaft 59 and that of the rear output shaft 63 are made to be completely regardless of each other so as to correspond to the antiskid system (ABS).

As described above, according to the present invention, the transfer portion connected to the output shaft of the transmission portion has the front planetary gear unit the output element of which is connected to the front wheels and the rear planetary gear unit the output element of which is connected to the rear wheels. The front planetary gear unit and the rear planetary gear unit are connected to each other by the common element. Furthermore, the output shaft of the transmission posrtion is directly connected to the input element of either of the above-described planetary gear units. In addition, the output shaft of the transmission portion is also connected to the input element of the other planetary gear unit via the clutch $C_3$. The input element of the other planetary gear unit is connected to the case via the brake $B_4$. Therefore, the reduction function can be realized in cooperation with the two planetary gear units. Therefore, the four-wheel drive device can be lightened.

Since the differential gear device is constituted by the planetary gear unit, a compact and light four-wheel drive device can be provided. Furthermore, the neutral state can be created by completely freeing the four wheels and the rear wheels. Therefore, the antiskid system (ABS) can be easily controlled.

Furthermore, the clutch $C_4$ is disposed between the output element of the front planetary gear unit and that of the rear planetary gear unit. As a result, the torque distribution can be performed at a desired ratio by changing the torque capacity of the clutch $C_4$.

Furthermore, the torque circulation between the front wheels and the rear wheels can be freed by disconnecting the clutch $C_4$ so as to correspond to the antiskid system.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What we claim is:

1. A four-wheel drive device for dividing torque transmitted from an engine into torque for driving front wheels and that for driving rear wheels of a four-wheel drive vehicle, comprising:
   (a) a transmission portion having,
      (i) an input element connected to the engine,
      (ii) a gear unit for changing the torque of the input element, and
      (iii) an output element connected to the gear unit,
   (b) a transfer portion having
      (i) an input element connected to the output element of the transmission portion,
      (ii) first and second planetary gear units including sun gears, carriers, and ring gears, said sun gears connected to each other and said second ring gear connected to the input element of the transfer portion,
      (iii) a first clutch disposed between the input element of the transfer portion and the first carrier,
      (iv) a brake connected between a case and the first carrier,
      (v) a first output element connected between the first ring gear and one of the front and rear wheels, and
      (vi) a second output element connected between the second carrier and another of the front and rear wheels.

2. A four-wheel drive device according to claim 1, wherein said first clutch is connected in the non-deceleration state and is disconnected in the deceleration state and the neutral state and said brake is disconnected in the non-deceleration state and the neutral state and is connected in the deceleration state.

3. A four-wheel drive device according to claim 1, further comprising:
   a second clutch disposed between the first and second output elements.

4. A four-wheel drive device according to claim 3, wherein said second clutch is a differential-limiting clutch, the state of connection of which can be successively changed between the completely-connected state and the completely-disconnected state.

5. A four-wheel drive device according to claim 2, wherein said first output element is connected to the front wheels.

6. A four-wheel drive device according to claim 4, wherein said first output element is connected to the front wheels.

7. A four-wheel drive device according to claim 1, wherein said transmission portion has an automatic transmission.

8. A four-wheel drive device according to claim 2, wherein said transmission portion has an automatic transmission.

9. A four-wheel drive device according to claim 3, wherein said transmission portion has an automatic transmission.

10. A four-wheel drive device according to claim 4, wherein said transmission portion has an automatic transmission.

11. A four-wheel drive device according to claim 5, wherein said transmission portion has an automatic transmission.

12. A four-wheel drive device according to claim 6, wherein said transmission portion has an automatic transmission.

* * * * *